US008613813B2

(12) United States Patent
Johnson et al.

(10) Patent No.: US 8,613,813 B2

(45) Date of Patent: Dec. 24, 2013

(54) FORMING OF METALLIC GLASS BY RAPID CAPACITOR DISCHARGE

(75) Inventors: William L. Johnson, Pasadena, CA (US); Marios D. Demetriou, Los Angeles, CA (US); Choong Paul Kim, Glendale, CA (US); Joseph P. Schramm, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 603 days.

(21) Appl. No.: 12/409,253

(22) Filed: Mar. 23, 2009

(65) Prior Publication Data

US 2009/0236017 A1 Sep. 24, 2009

Related U.S. Application Data

(60) Provisional application No. 61/070,284, filed on Mar. 21, 2008.

(51) Int. Cl.
*C22F 1/10* (2006.01)
*B23K 15/00* (2006.01)

(52) U.S. Cl.
USPC ...... 148/561; 219/121.11; 219/773; 72/342.1

(58) Field of Classification Search
USPC .............. 148/561; 219/121.11, 773; 72/342.1
See application file for complete search history.

(56) References Cited

U.S. PATENT DOCUMENTS

| | | | |
|---|---|---|---|
| 3,332,747 | A | 7/1967 | Bundy |
| 3,537,045 | A | 10/1970 | Ichiro |
| 3,863,700 | A | 2/1975 | Bedell et al. |
| 4,115,682 | A | 9/1978 | Kavesh et al. |
| 4,355,221 | A | 10/1982 | Lin |
| 4,715,906 | A | 12/1987 | Taub et al. |
| 4,809,411 | A | 3/1989 | Lin et al. |

(Continued)

FOREIGN PATENT DOCUMENTS

| | | |
|---|---|---|
| FR | 2806019 | 9/2001 |
| JP | 63-220950 | 9/1988 |

(Continued)

OTHER PUBLICATIONS

International Search Report for International Application PCT/US2009/037970, filed Mar. 23, 2009, Search completed May 18, 2009, 2 pgs.

(Continued)

*Primary Examiner* — Rebecca Lee
(74) *Attorney, Agent, or Firm* — Dorsey & Whitney LLP

(57) ABSTRACT

An apparatus and method of uniformly heating, rheologically softening, and thermoplastically forming metallic glasses rapidly into a net shape using a rapid capacitor discharge forming (RCDF) tool are provided. The RCDF method utilizes the discharge of electrical energy stored in a capacitor to uniformly and rapidly heat a sample or charge of metallic glass alloy to a predetermined "process temperature" between the glass transition temperature of the amorphous material and the equilibrium melting point of the alloy in a time scale of several milliseconds or less. Once the sample is uniformly heated such that the entire sample block has a sufficiently low process viscosity it may be shaped into high quality amorphous bulk articles via any number of techniques including, for example, injection molding, dynamic forging, stamp forging, and blow molding in a time frame of less than 1 second.

16 Claims, 16 Drawing Sheets

(56) References Cited

U.S. PATENT DOCUMENTS

| | | | | |
|---|---|---|---|---|
| 4,950,337 | A | 8/1990 | Li et al. | |
| 5,005,456 | A | 4/1991 | Ballard et al. | |
| 5,075,051 | A * | 12/1991 | Ito et al. | 264/40.1 |
| 5,278,377 | A | 1/1994 | Tsai | |
| 5,288,344 | A | 2/1994 | Peker et al. | |
| 5,324,368 | A | 6/1994 | Masumoto et al. | |
| 5,368,659 | A | 11/1994 | Peker et al. | |
| 5,554,838 | A * | 9/1996 | Berdich | 219/240 |
| 5,618,359 | A | 4/1997 | Lin et al. | |
| 5,735,975 | A | 4/1998 | Lin et al. | |
| 5,896,642 | A | 4/1999 | Peker et al. | |
| 6,027,586 | A | 2/2000 | Masumoto et al. | |
| 6,235,381 | B1 | 5/2001 | Sanders et al. | |
| 6,258,183 | B1 | 7/2001 | Onuki et al. | |
| 6,293,155 | B1 | 9/2001 | Babiel | |
| 6,355,361 | B1 | 3/2002 | Ueno et al. | |
| 6,432,350 | B1 | 8/2002 | Seres et al. | |
| 6,771,490 | B2 | 8/2004 | Peker et al. | |
| 6,875,293 | B2 | 4/2005 | Peker | |
| 7,120,185 | B1 | 10/2006 | Richards | |
| 7,506,566 | B2 | 3/2009 | Decristofaro et al. | |
| 7,883,592 | B2 | 2/2011 | Hofmann et al. | |
| 8,276,426 | B2 | 10/2012 | Musat et al. | |
| 2001/0033304 | A1 * | 10/2001 | Ishinaga et al. | 347/12 |
| 2003/0183310 | A1 | 10/2003 | McRae | |
| 2004/0035502 | A1 * | 2/2004 | Kang et al. | 148/403 |
| 2005/0034787 | A1 | 2/2005 | Yong | |
| 2005/0103271 | A1 * | 5/2005 | Watanabe et al. | 118/719 |
| 2005/0202656 | A1 | 9/2005 | Ito et al. | |
| 2005/0236071 | A1 | 10/2005 | Koshiba et al. | |
| 2006/0102315 | A1 | 5/2006 | Lee et al. | |
| 2006/0293162 | A1 | 12/2006 | Ellison | |
| 2007/0003782 | A1 * | 1/2007 | Collier | 428/621 |
| 2007/0034304 | A1 | 2/2007 | Inoue et al. | |
| 2008/0081213 | A1 | 4/2008 | Ito et al. | |
| 2008/0135138 | A1 | 6/2008 | Duan et al. | |
| 2008/0302775 | A1 | 12/2008 | Machrowicz | |
| 2010/0009212 | A1 | 1/2010 | Utsunomiya et al. | |
| 2010/0047376 | A1 | 2/2010 | Imbeau et al. | |
| 2010/0121471 | A1 | 5/2010 | Higo et al. | |
| 2010/0320195 | A1 | 12/2010 | Fujita et al. | |
| 2012/0006085 | A1 | 1/2012 | Johnson et al. | |
| 2012/0103478 | A1 | 5/2012 | Johnson et al. | |
| 2012/0132625 | A1 | 5/2012 | Kaltenboeck et al. | |
| 2012/0255338 | A1 | 10/2012 | Johnson et al. | |
| 2013/0001222 | A1 | 1/2013 | Kaltenboeck et al. | |
| 2013/0025814 | A1 | 1/2013 | Demetriou et al. | |

FOREIGN PATENT DOCUMENTS

| | | |
|---|---|---|
| JP | 11-001729 | 1/1999 |
| KR | 10-0271356 | 11/2000 |
| WO | WO 2009/117735 | 9/2009 |
| WO | WO 2011/127414 | 10/2011 |
| WO | WO 2012/051443 | 4/2012 |
| WO | WO 2012/092208 | 7/2012 |
| WO | WO 2012/103552 | 8/2012 |
| WO | WO 2012/112656 | 8/2012 |

OTHER PUBLICATIONS

Written Opinion for International Application PCT/US2009/037970, filed Mar. 23, 2009, Opinion completed May 18, 2009, 5 pgs.

De Oliveira et al., "Electromechanical engraving and writing on bulk metallic glasses", Applied Physics Letters, Aug. 26, 2002, vol. 81, No. 9, pp. 1606-1608.

Duan et al., "Bulk Metallic Glass with Benchmark Thermoplastic Processability", Adv. Mater., 2007, vol. 19, pp. 4272-4275.

Wiest et al., "Zi-Ti-based Be-bearing glasses optimized for high thermal stability and thermoplastic formability", Acta Materialia, 2008, vol. 56, pp. 2625-2630.

Yavari et al., "Electromechanical shaping, assembly and engraving of bulk metallic glasses", Materials Science and Engineering A, 2004, vol. 375-377, pp. 227-234.

Yavari et al., "Shaping of Bulk Metallic Glasses by Simultaneous Application of Electrical Current and Low Stress", Mat. Res. Soc. Symp. Proc., 2001, vol. 644, pp. L12.20.1-L12.20.6.

Ehrt et al., "Electrical conductivity and viscosity of borosilicate glasses and melts,"Phys. Chem. Glasses: Eur. J. Glass Sci. Technol. B, Jun. 2009, 50(3), pp. 165-171.

Love, "Temperature dependence of electrical conductivity and the probability density function," J. Phys. C: Solid State Phys., 16, 1983, pp. 5985-5993.

Mattern et al., "Structural behavior and glass transition of bulk metallic glasses,"Journal of Non-Crystalline Solids, 345&346, 2004, pp. 758-761.

* cited by examiner

FORMING OF METALLIC GLASS BY RAPID CAPACITOR DISCHARGE

CROSS-REFERENCE TO RELATED APPLICATIONS

This application claims priority to U.S. Provisional Application No. 61/070,284, filed Mar. 21, 2008, the disclosure of which is incorporated herein by reference.

FIELD OF THE INVENTION

This invention relates generally to a novel method of forming metallic glass; and more particularly to a process for forming metallic glass using rapid capacitor discharge heating.

BACKGROUND OF THE INVENTION

Amorphous materials are a new class of engineering material, which have a unique combination of high strength, elasticity, corrosion resistance and processability from the molten state. Amorphous materials differ from conventional crystalline alloys in that their atomic structure lacks the typical long-range ordered patterns of the atomic structure of conventional crystalline alloys. Amorphous materials are generally processed and formed by cooling a molten alloy from above the melting temperature of the crystalline phase (or the thermodynamic melting temperature) to below the "glass transition temperature" of the amorphous phase at "sufficiently fast" cooling rates, such that the nucleation and growth of alloy crystals is avoided. As such, the processing methods for amorphous alloys have always been concerned with quantifying the "sufficiently fast cooling rate", which is also referred to as "critical cooling rate", to ensure formation of the amorphous phase.

The "critical cooling rates" for early amorphous materials were extremely high, on the order of $10^{6°}$ C./sec. As such, conventional casting processes were not suitable for such high cooling rates, and special casting processes such as melt spinning and planar flow casting were developed. Due to the crystallization kinetics of those early alloys being substantially fast, extremely short time (on the order of $10^{-3}$ seconds or less) for heat extraction from the molten alloy were required to bypass crystallization, and thus early amorphous alloys were also limited in size in at least one dimension. For example, only very thin foils and ribbons (order of 25 microns in thickness) were successfully produced using these conventional techniques. Because the critical cooling rate requirements for these amorphous alloys severely limited the size of parts made from amorphous alloys, the use of early amorphous alloys as bulk objects and articles was limited.

Over the years it was determined that the "critical cooling rate" depends strongly on the chemical composition of amorphous alloys. Accordingly, a great deal of research was focused on developing new alloy compositions with much lower critical cooling rates. Examples of these alloys are given in U.S. Pat. Nos. 5,288,344; 5,368,659; 5,618,359; and 5,735,975, each of which is incorporated herein by reference. These amorphous alloy systems, also called bulk-metallic glasses or BMGs, are characterized by critical cooling rates as low as a few ° C./second, which allows the processing and forming of much larger bulk amorphous phase objects than were previously achievable.

With the availability of low "critical cooling rate" BMGs, it has become possible to apply conventional casting processes to form bulk articles having an amorphous phase. Over the past several years, a number of companies, including LiquidMetal Technologies, Inc. have undertaken an effort to develop commercial manufacturing technologies for the production of net shape metallic parts fabricated from BMGs. For example, manufacturing methods such as permanent mold metal die-casting and injection casting into heated molds are currently being used to fabricate commercial hardware and components such as electronic casings for standard consumer electronic devices (e.g., cell phones and handheld wireless devices), hinges, fasteners, medical instruments and other high value added products. However, even though bulk-solidifying amorphous alloys provide some remedy to the fundamental deficiencies of solidification casting, and particularly to the die-casting and permanent mold casting processes, as discussed above, there are still issues which need to be addressed. First and foremost, there is a need to make these bulk objects from a broader range of alloy compositions. For example, presently available BMGs with large critical casting dimensions capable of making large bulk amorphous objects are limited to a few groups of alloy compositions based on a very narrow selection of metals, including Zr-based alloys with additions of Ti, Ni, Cu, Al and Be and Pd-based alloys with additions of Ni, Cu, and P, which are not necessarily optimized from either an engineering or cost perspective.

In addition, the current processing technology requires a great deal of expensive machinery to ensure appropriate processing conditions are created. For example, most shaping processes require a high vacuum or controlled inert gas environment, induction melting of material in a crucible, pouring of metal to a shot sleeve, and pneumatic injection through a shot sleeve into gating and cavities of a rather elaborate mold assembly. These modified die-casting machines can cost several hundreds of thousands of dollars per machine. Moreover, because heating a BMG has to date been accomplished via these traditional, slow thermal processes, the prior art of processing and forming bulk-solidifying amorphous alloys has always been focused on cooling the molten alloy from above the thermodynamic melting temperature to below the glass transition temperature. This cooling has either been realized using a single-step monotonous cooling operation or a multi-step process. For example, metallic molds (made of copper, steel, tungsten, molybdenum, composites thereof, or other high conductivity materials) at ambient temperatures are utilized to facilitate and expedite heat extraction from the molten alloy. Because the "critical casting dimension" is correlated to the critical cooling rate, these conventional processes are not suitable for forming larger bulk objects and articles of a broader range of bulk-solidifying amorphous alloys. In addition, it is often necessary to inject the molten alloy into the dies at high-speed, and under high-pressure, to ensure sufficient alloy material is introduced into the die prior to the solidification of the alloy, particularly in the manufacture of complex and high-precision parts. Because the metal is fed into the die under high pressure and at high velocities, such as in high-pressure die-casting operation, the flow of the molten metal becomes prone to Rayleigh-Taylor instability. This flow instability is characterized by a high Weber number, and is associated with the break-up of the flow front causing the formation of protruded seams and cells, which appear as cosmetic and structural micro-defects in cast parts. Also, there is a tendency to form a shrinkage cavity or porosity along the centerline of the die-casting mold when unvitrified liquid is trapped inside a solid shell of vitrified metal.

Attempts to remedy the problems associated with rapidly cooling the material from above the equilibrium melting point to below the glass transition were mostly focused on utilizing the kinetic stability and viscous flow characteristics of the supercooled liquid. Methods have been proposed that involve heating glassy feedstock above the glass transition where the glass relaxes to a viscous supercooled liquid, applying pressure to form the supercooled liquid, and subsequently cooling to below glass transition prior to crystallizing. These attractive methods are essentially very similar to those used to process plastics. In contrast to plastics however, which remain stable against crystallization above the softening transition for extremely long periods of time, metallic supercooled liquids crystallize rather rapidly once relaxed at the glass transition. Consequently, the temperature range over which metallic glasses are stable against crystallization when heated at conventional heating rates (20° C./min) are rather small (50-100° C. above glass transition), and the liquid viscosity within that range is rather high ($10^9$-$10^7$ Pa s). Owing to these high viscosities, the pressures required to form these liquids into desirable shapes are enormous, and for many metallic glass alloys could exceed the pressures attainable by conventional high strength tooling (<1 GPa). Metallic glass alloys have recently been developed that are stable against crystallization when heated at conventional heating rates up to considerably high temperatures (165° C. above glass transition). Examples of these alloys are given in U.S. Pat. Appl. 20080135138 and articles to G. Duan et at. (Advanced Materials, 19 (2007) 4272) and A. Wiest (Acta Materialia, 56 (2008) 2525-2630), each of which is incorporated herein by reference. Owing to their high stability against crystallization, process viscosities as low as $10^5$ Pa-s become accessible, which suggests that these alloys are more suitable for processing in the supercooled liquid state than traditional metallic glasses. These viscosities however are still substantially higher than the processing viscosities of plastics, which typically range between 10 and 1000 Pa-s. In order to attain such low viscosities, the metallic glass alloy should either exhibit an even higher stability against crystallization when heated by conventional heating, or be heated at an unconventionally high heating rate which would extend the temperature range of stability and lower the process viscosity to values typical of those used in processing thermoplastics.

A few attempts have been made to create a method of instantaneously heating a BMG up to a temperature sufficient for shaping, thereby avoiding many of the problems discussed above and simultaneously expanding the types of amorphous materials that can be shaped. For example, U.S. Pat. Nos. 4,115,682 and 5,005,456 and articles to A. R. Yavari (Materials Research Society Symposium Proceedings, 644 (2001) L12-20-1, Materials Science & Engineering A, 375-377 (2004) 227-234; and Applied Physics Letters, 81(9) (2002) 1606-1608), the disclosures of each of which are incorporated herein by reference, all take advantage of the unique conductive properties of amorphous materials to instantaneously heat the materials to a shaping temperature using Joule heating. However, thus far these techniques have focused on localized heating of BMG samples to allow for only localized forming, such as the joining (i.e., spot welding) of such pieces, or the formation of surface features. None of these prior art methods teach how to uniformly heat the entire BMG specimen volume in order to be able to perform global forming. Instead, all those prior art methods anticipate temperature gradients during heating, and discuss how these gradients could affect local forming. For instance, Yavari et al (Materials Research Society Symposium Proceedings, 644 (2001) L12-20-1) write: "The external surfaces of the BMG specimen being shaped, whether in contact with the electrodes or with the ambient (inert) gas in the shaping chamber, will be slightly cooler than the inside as the heat generated by the current dissipates out of the sample by conduction, convection or radiation. On the other hand, the outer surfaces of samples heated by conduction, convection or radiation are slightly hotter than the inside. This is an important advantage for the present method as crystallization and or oxidation of metallic glasses often begin first on outer surfaces and interfaces and if they are slightly below the temperature of the bulk, such undesirable surface crystal formation may be more easily avoided."

Another drawback of the limited stability of BMGs against crystallization above the glass transition is the inability to measure thermodynamic and transport properties, such as heat capacity and viscosity, over the entire range of temperatures of the metastable supercooled liquid. Typical measurement instruments such as Differential Scanning Calorimeters, Thermo-Mechanical Analyzers, and Couette Viscometers rely on conventional heating instrumentation, such as electric and induction heaters, and are thus capable of attaining sample heating rates that are considered conventional (typically <100° C./min). As discuss above, metallic supercooled liquids can be stable against crystallization over a limited temperature range when heated at a conventional heating rate, and thus the measureable thermodynamic and transport properties are limited to within the accessible temperature range. Consequently, unlike polymer and organic liquids which are very stable against crystallization and their thermodynamic and transport properties are measureable throughout the entire range of metastability, the properties of metallic supercooled liquids are only measureable to within narrow temperature ranges just above the glass transition and just below the melting point.

Accordingly, a need exists to find a novel approach to instantaneously and uniformly heat the entire BMG specimen volume and thus enable global shaping of amorphous metals. In addition, from a scientific perspective, a need also exists to find a novel approach to access and measure these thermodynamic and transport properties of metallic supercooled liquids.

BRIEF SUMMARY OF THE INVENTION

Thus, there is provided in accordance with the current invention a method and apparatus for shaping an amorphous material using rapid capacitor discharge heating (RCDF).

In one embodiment, the invention is directed to a method of rapidly heating and shaping an amorphous material using a rapid capacitor discharge wherein a quantum of electrical energy is discharged uniformly through a substantially defect free sample having a substantially uniform cross-section to rapidly and uniformly heat the entirety of the sample to a processing temperature between the glass transition temperature of the amorphous phase and the equilibrium melting temperature of the alloy and simultaneously shaping and then cooling the sample into an amorphous article. In one such embodiment, the sample is preferably heated to the processing temperature at a rate of at least 500 K/sec. In another such embodiment, the step of shaping uses a conventional forming technique, such as, for example, injection molding, dynamic forging, stamp forging and blow molding.

In another embodiment, the amorphous material is selected with a relative change of resistivity per unit of temperature change (S) of about $1\times10^{-4}$° $C.^{-1}$. In one such embodiment, the amorphous material is an alloy based on an elemental metal selected from the group consisting of Zr, Pd, Pt, Au, Fe, Co, Ti, Al, Mg, Ni and Cu.

In yet another embodiment, the quantum of electrical energy is discharged into the sample through at least two electrodes connected to opposite ends of said sample in a manner such that the electrical energy is introduced into the sample uniformly. In one such embodiment, the method uses a quantum of electrical energy of at least 100 Joules.

In still another embodiment, the processing temperature is about half-way between the glass transition temperature of the amorphous material and the equilibrium melting point of the alloy. In one such embodiment, the processing temperature is at least 200 K above the glass transition temperature of the amorphous material. In one such embodiment, the processing temperature is such that the viscosity of the heated amorphous material is between about 1 to $10^4$ Pas-sec.

In still yet another embodiment, the forming pressure used to shape the sample is controlled such that the sample is deformed at a rate sufficiently slow to avoid high Weber-number flow.

In still yet another embodiment, the deformational rate used to shape the sample is controlled such that the sample is deformed at a rate sufficiently slow to avoid high Weber-number flow.

In still yet another embodiment, the initial amorphous metal sample (feedstock) may be of any shape with a uniform cross section such as, for example, a cylinder, sheet, square and rectangular solid.

In still yet another embodiment, the contact surfaces of the amorphous metal sample are cut parallel and polished flat in order to ensure good contact with the electrode contact surface.

In still yet another embodiment, the invention is directed to a rapid capacitor discharge apparatus for shaping an amorphous material. In one such embodiment, the sample of amorphous material has a substantially uniform cross-section. In another such embodiment, at least two electrodes connect a source of electrical energy to the sample of amorphous material. In such an embodiment the electrodes are attached to the sample such that substantially uniform connections are formed between the electrodes and the sample. In still another such embodiment, the electromagnetic skin depth of the dynamic electric field is large compared to the radius, width, thickness and length of the charge.

In still yet another embodiment, the electrode material is chosen to be a metal with a low yield strength and high electrical and thermal conductivity such as, for example, copper, silver or nickel, or alloys formed with at least 95 at % of copper, silver or nickel.

In still yet another embodiment, a “seating” pressure is applied between the electrodes and the initial amorphous sample in order to plastically deform the contact surface of the electrode at the electrode/sample interface to conform it to the microscopic features of the contact surface of the sample.

In still yet another embodiment, a low-current “seating” electrical pulse is applied between the electrodes and the initial amorphous sample in order to locally soften any non-contact regions of the amorphous sample at the contact surface of the electrode, and thus conform it to the microscopic features of the contact surface of the electrode.

In still yet another embodiment of the apparatus, the source of electrical energy is capable of producing a quantum of electrical energy sufficient to uniformly heat the entirety of the sample to a processing temperature between the glass transition temperature of the amorphous phase and the equilibrium melting temperature of the alloy at a rate of at least 500 K/sec. In such an embodiment of the apparatus, the source of electrical energy is discharged at a rate such that the sample is adiabatically heated, or in other words at a rate much higher than the thermal relaxation of the amorphous metal sample, in order to avoid thermal transport and development of the thermal gradients and thus promote uniform heating of the sample.

In still yet another embodiment of the apparatus, the shaping tool used in the apparatus is selected from the group consisting of an injection mold, a dynamic forge, a stamp forge and a blow mold, and is capable of imposing a deformational strain sufficient to form said heated sample. In one such embodiment, the shaping tool is at least partially formed from at least one of the electrodes. In an alternative such embodiment, the shaping tool is independent of the electrodes.

In still yet another embodiment of the apparatus, a pneumatic or magnetic drive system is provided for applying the deformational force to the sample. In such a system the deformational force or deformational rate can be controlled such that the heated amorphous material is deformed at a rate sufficiently slow to avoid high Weber-number flow.

In still yet another embodiment of the apparatus, the shaping tool further comprises a heating element for heating the tool to a temperature preferably around the glass transition temperature of the amorphous material. In such an embodiment, the surface of the formed liquid will be cooled more slowly thus improving the surface finish of the article being formed.

In still yet another embodiment, a tensile deformational force is applied on an adequately-gripped sample during the discharge of energy in order to draw a wire or fiber of uniform cross section.

In still yet another embodiment, the tensile deformational force is controlled so that the flow of the material is Newtonian and failure by necking is avoided.

In still yet another embodiment, the tensile deformational rate is controlled so that the flow of the material is Newtonian and failure by necking is avoided.

In still yet another embodiment, a stream of cold helium is blown onto the drawn wire or fiber to facilitate cooling below glass transition.

In still yet another embodiment, the invention is directed to a rapid capacitor discharge apparatus for measuring thermodynamic and transport properties of the supercooled liquid over the entire range of its metastability. In one such embodiment, a high-resolution and high-speed thermal imaging camera is used to simultaneously record the uniform heating and uniform deformation of a sample of amorphous metal. The temporal, thermal, and deformational data can be converted into time, temperature, and strain data, while the input electrical power and imposed pressure can be converted into internal energy and applied stress, thereby yielding information concerning the temperature, temperature dependent viscosity, heat capacity and enthalpy of the sample.

BRIEF DESCRIPTION OF THE DRAWINGS

The description will be more fully understood with reference to the following figures and data graphs, which are presented as exemplary embodiments of the invention and should not be construed as a complete recitation of the scope of the invention, wherein.

DETAILED DESCRIPTION OF THE INVENTION

The current invention is directed to a method of uniformly heating, rheologically softening, and thermoplastically forming metallic glasses rapidly (typically with processing times of less than 1 second into a net shape article using an extrusion or mold tool by Joule heating. More specifically, the method utilizes the discharge of electrical energy (typically 100 Joules to 100 KJoules) stored in a capacitor to uniformly and rapidly heat a sample or charge of metallic glass alloy to a predetermined "process temperature" about half-way between the glass transition temperature of the amorphous material and the equilibrium melting point of the alloy in a time scale of several milliseconds or less, and is referred to hereinafter as rapid capacitor discharge forming (RCDF). The RCDF process of the current invention proceeds from the observation that metallic glass, by its virtue of being a frozen liquid, has a relatively low electrical resistivity, which can result in high dissipation and efficient, uniform heating of the material at rate such that the sample is adiabatically heated with the proper application of an electrical discharge.

By rapidly and uniformly heating a BMG, the RCDF method extends the stability of the supercooled liquid against crystallization to temperatures substantially higher than the glass transition temperature, thereby bringing the entire sample volume to a state associated with a processing viscosity that is optimal for forming. The RCDF process also provides access to the entire range of viscosities offered by the metastable supercooled liquid, as this range is no longer limited by the formation of the stable crystalline phase. In sum, this process allows for the enhancement of the quality of parts formed, an increase yield of usable parts, a reduction in material and processing costs, a widening of the range of usable BMG materials, improved energy efficiency, and lower capital cost of manufacturing machines. In addition, owing to the instantaneous and uniform heating that can be attained in the RCDF method, the thermodynamic and transport properties throughout the entire range of the liquid metastability become accessible for measurement. Therefore by incorporating additional standard instrumentation to a Rapid Capacitor Discharge set up such as temperature and strain measurement instrumentation, properties such as viscosity, heat capacity and enthalpy can be measured in the entire temperature range between glass transition and melting point.

Figure 1:
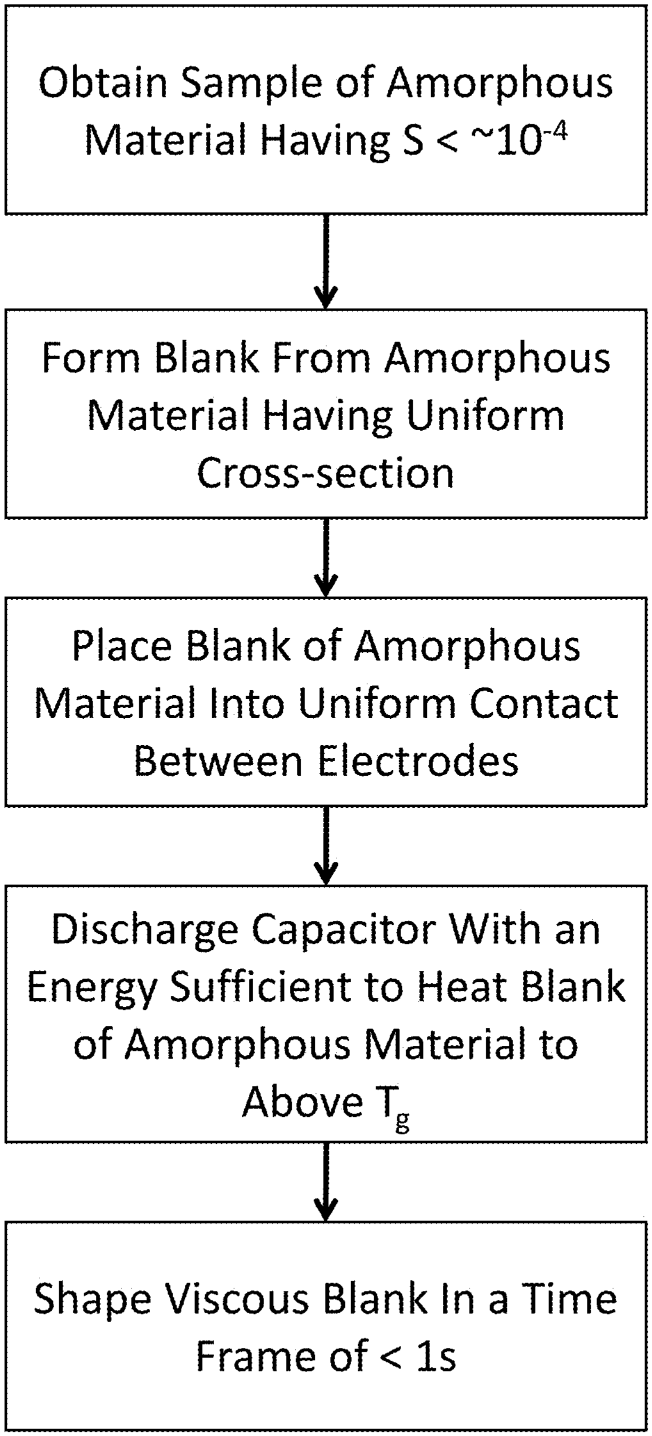
FIG. 1, provides a flow chart of an exemplary rapid capacitor discharge forming method in accordance with the current invention.

A simple flow chart of the RCDF technique of the current invention is provided in FIG. 1. As shown, the process begins with the discharge of electrical energy (typically 100 Joules to 100 KJoules) stored in a capacitor into a sample block or charge of metallic glass alloy. In accordance with the current invention, the application of the electrical energy may be used to rapidly and uniformly heat the sample to a predetermined "process temperature" above the glass transition temperature of the alloy, and more specifically to a processing temperature about half-way between the glass transition temperature of the amorphous material and the equilibrium melting point of the alloy (~200-300 K above $T_g$), on a time scale of several microseconds to several milliseconds or less, such that the amorphous material has a process viscosity sufficient to allow facile shaping (~1 to $10^4$ Pas-s or less).

Once the sample is uniformly heated such that the entire sample block has a sufficiently tow process viscosity, it may be shaped into a high quality amorphous bulk article via any number of techniques including, for example, injection molding, dynamic forging, stamp forging, blow molding, etc. However, the ability to shape a charge of metallic glass depends entirely on ensuring that the heating of the charge is both rapid and uniform across the entire sample block. If uniform heating is not achieved, then the sample will instead experience localized heating and, although such localized heating can be useful for some techniques, such as, for example, joining or spot-welding pieces together, or shaping specific regions of the sample, such localized heating has not and cannot be used to perform bulk shaping of samples. Likewise, if the sample heating is not sufficiently rapid (typically on the order of 500-$10^5$ K/s) then either the material being formed will lose its amorphous character, or the shaping technique will be limited to those amorphous materials having superior processability characteristics (i.e., high stability of the supercooled liquid against crystallization), again reducing the utility of the process.

The RCDF method of the current invention ensures the rapid uniform heating of a sample. However, to understand the necessary criteria for obtaining rapid, uniform heating of a metallic glass sample using RCDF it is necessary to first understand how Joule heating of metal materials occurs. The temperature dependence of the electrical resistivity of a metal can be quantified in terms of a relative change of resistivity per unit of temperature change coefficient, S, where S is defined as:

$$S=(1/\rho_0)[d\rho(T)/dT]_{To} \quad \text{(Eq. 1)}$$

where S is in units of (1/degrees-C.), $\rho_0$ is the resistivity (in Ohm-cm) of the metal at room temperature $T_o$, and $[d\rho/dT]_{To}$ is the temperature derivative of the resistivity at room temperature (in Ohm-cm/C) taken to be linear. A typical amorphous material has a large $\rho_0$($80\ \mu\Omega\text{-cm}<\rho_0<300\ \mu\Omega\text{-cm}$), but a very small (and frequently negative) value of S ($-1\times10^{-4}<S<+1\times10^{-4}$).

For the small S values found in amorphous alloys, a sample of uniform cross-section subjected to a uniform current density will be ohmically heated uniformly in space, the sample will be rapidly heated from ambient temperature, $T_0$, to a final temperature, $T_F$, which depends on the total energy of the capacitor, given by the equation:

$$E=\frac{1}{2}CV^2 \quad \text{(Eq. 2)}$$

and the total heat capacity, $C_s$ (in Joules/C), of the sample charge. $T_F$ will be given by the equation:

$$T_F=T_0+E/C_s \quad \text{(Eq. 3).}$$

In turn, the heating time will be determined by the time constant $\tau_{RC}$=RC of the capacitive discharge. Here R is the total resistance of the sample (plus output resistance of the capacitive discharge circuit. Accordingly, in theory the typical heating rate for a metallic glass can be given by the equation:

$$dT/dt=(T_F-T_0)/\tau_{RC} \quad \text{(Eq. 4).}$$

By contrast, common crystalline metals have much lower $\rho_0$ (1-30 μΩ-cm) and much greater values of S~0.01-0.1. This leads to significant differences in behavior. For example, for common crystalline metals such as copper alloys, aluminum, or steel alloys, $\rho_0$ is much smaller (1-20 μΩ-cm) while S is much larger, typically S~0.01-0.1. The smaller $\rho_0$ values in crystalline metals will lead to smaller dissipation in the sample (compared with the electrodes) and make the coupling of the energy of the capacitor to the sample less efficient. Furthermore, when a crystalline metal melts, ρ(T) generally increases by a factor of 2 or more on going from the solid metal to the molten metal. The large S values along with increase of resistivity on melting of common crystalline metals leads to extreme non-uniform Ohmic heating in a uniform current density. The crystalline sample will invariably melt locally, typically in the vicinity of the high voltage electrode or other interface within the sample. In turn, a capacitor discharge of energy through a crystalline rod leads to spatial localization of heating and localized melting wherever the initial resistance was greatest (typically at interfaces). In fact, this is the basis of capacitive discharge welding (spot welding, projection welding, "stud welding" etc.) of crystalline metals where a local melt pool is created near the electrode/sample interface or other internal interface within the parts to be welded.

As discussed in the Background, prior art systems have also recognized the inherent conductive properties of amorphous materials; however, what has not been recognized to date is that to ensure uniform heating of the entire sample it is also necessary to avoid the dynamic development of spatial inhomogeneity in the energy dissipation within the heating sample. The RCDF method of the current invention sets forth two criteria, which must be met to prevent the development of such inhomogeneity and to ensure uniform heating of the charge:

- Uniformity of the current within the sample; and
- Stability of the sample with respect to development of inhomogeneity in power dissipation during dynamic heating.

Although these criteria seem relatively straightforward, they place a number of physical and technical constraints on the electrical charge used during heating, the material used for the sample, the shape of the sample, and the interface between the electrode used to introduce the charge and the sample itself. For example, for a cylindrical charge of length L and area $A=\pi R^2$ (R=sample radius), the following requirements would exist.

Uniformity of the current within the cylinder during capacity discharge requires that the electromagnetic skin depth, Λ, of the dynamic electric field is large compared to relevant dimensional characteristics of the sample (radius, length, width or thickness). In the example of a cylinder, the relevant characteristic dimensions would obviously be the radius and depth of the charge, R and L. This condition is satisfied when $\Lambda=[\rho_0\tau/\mu_0]^{1/2}>R$, L. Here τ is the "RC" time constant of the capacitor and sample system, $\mu_0=4\pi\times10^{-7}$ (Henry/m) is the permittivity of free space. For R and L ~1 cm, this implies τ>10-100 μs. Using typical dimensions of interest and values of resistivity of amorphous alloys, this requires a suitably sized capacitor, typically capacitance of ~10,000 μF or greater.

Stability of the sample with respect to development of inhomogeneity in power dissipation during dynamic heating can be understood by carrying out stability analysis which includes Ohmic "Joule" heating by the current and heat flow governed by the Fourier equation. For a sample with resistivity, which increases with temperature (i.e., positive S), a local temperature variation along the axis of the sample cylinder will increase local heating, which further increases the local resistance and heat dissipation. For sufficiently high power input, this leads to "localization" of heating along the cylinder. For crystalline materials, it results in localized melting. Whereas this behavior is useful in welding where one wishes to produce local melting along interfaces between components, this behavior is extremely undesirable if one wishes to uniformly heat an amorphous material. The present invention provides a critical criterion to ensure uniform heating. Using S as defined above, we find heating should be uniform when:

$$S<\frac{(2\pi)^2DC_S}{L^2I^2R_0}=S_{crit} \quad \text{(Eq. 5)}$$

where D is the thermal diffusivity ($m^2/s$) of the amorphous material, $C_S$ is the total heat capacity of the sample, and $R_0$ is the total resistance of the sample. Using values of D and $C_S$ typical of metallic glass, and assuming a length (L~1 cm), and an input power $I^2R_0\sim10^6$ Watts, typically required for the present invention, it is possible to obtain a $S_{crit}\sim10^{-4}$-$10^{-5}$. This criterion for uniform heating should be satisfied for many metallic glasses (see above S values). In particular, many metallic glasses have S<0. Such materials (i.e., with S<0) will always satisfy this requirement for heating uniformity. Exemplary materials that meet this criterion are set forth in U.S. Pat. Nos. 5,288,344; 5,368,659; 5,618,359; and 5,735,975, the disclosures of which are incorporated herein by reference.

Beyond the fundamental physical criteria of the charge applied and the amorphous materials used there are also technical requirements to ensure that the charge is applied as evenly as possible to the sample. For example, it is important the sample be substantially free of defects and formed with a uniform cross-section. If these conditions are not met, the heat will not dissipate evenly across the sample and localized heating will occur. Specifically, if there is a discontinuity or defect in the sample block then the physical constants (i.e., D and $C_S$) discussed above will be different at those points leading to differential heating rates. In addition, because the thermal properties of the sample also are dependent on the dimensions of the item (i.e., L) if the cross-section of the item changes then there will be localized hot spots along the sample block. Moreover, if the sample contact surfaces are not adequately flat and parallel, an interfacial contact resistance will exist at the electrode/sample interface. Accordingly, in one embodiment the sample block is formed such that it is substantially free of defects and has a substantially uniform cross-section. It should be understood that though the cross-section of the sample block should be uniform, as long as this requirement is met there are no inherent constraints placed on the shape of the block. For example, the block may take any suitable geometrically uniform shape, such as a sheet, block, cylinder, etc. In another embodiment, the sample contact surfaces are cut parallel and polished flat in order to ensure good contact with the electrodes.

In addition, it is important that no interfacial contact resistance develops between the electrode and the sample. To accomplish this, the electrode/sample interface must be designed to ensure that the electrical charge is applied evenly, i.e., with uniform density, such that no "hot points" develop at the interface. For example, if different portions of the electrode provide differential conductive contact with the sample, spatial localization of heating and localized melting will occur wherever the initial resistance is greatest. This in turn will lead to discharge welding where a local melt pool is created near the electrode/sample interface or other internal interface within the sample. In light of this requirement of uniform current density, in one embodiment of the current invention the electrodes are polished flat and parallel to ensure good contact with the sample. In another embodiment of the current invention the electrodes are made of a soft metal, and uniform "seating" pressure is applied that exceeds the electrode material yield strength at the interface, but not the electrode buckling strength, so that the electrode is positively pressed against the entire interface yet unbuckled, and any non-contact regions at the interface are plastically deformed. In yet another embodiment of the current invention, a uniform low-energy "seating" pulse is applied that is barely sufficient to raise the temperature of any non-contact regions of the amorphous sample at the contact surface of the electrode to slightly above the glass transition temperature of the amorphous material, and thus allowing the amorphous sample to conform to the microscopic features of the contact surface of the electrode. In addition, in yet another embodiment the electrodes are positioned such that positive and negative electrodes provide a symmetric current path through the sample. Some suitable metals for electrode material are Cu, Ag and Ni, and alloys made substantially of Cu, Ag and Ni (i.e., that contain at least 95 at % of these materials).

Lastly, provided that the electric energy is successfully discharged uniformly into the sample, the sample will heat up uniformly if heat transport towards the cooler surrounding and electrodes is effectively evaded, i.e., if adiabatic heating is achieved. To generate adiabatic heating conditions, dT/dt has to be high enough, or $\tau_{RC}$ small enough, to ensure that thermal gradients due to thermal transport do not develop in the sample. To quantify this criterion, the magnitude of $\tau_{RC}$ should be considerably smaller than the thermal relaxation time of the amorphous metal sample, $\tau_{th}$, given by the following equation:

$$\tau_{th}=c_s R^2/k_s \quad \text{(Eq. 5).}$$

where $k_s$ and $c_s$ are the thermal conductivity and specific heat capacity of the amorphous metal, and R is the characteristic length scale of the amorphous metal sample (e.g. the radius of a cylindrical sample). Taking $k_s$~10 W/(m K) and $c_s$~$5\times10^6$ J/($m^3$ K) representing approximate values for Zr-based glasses, and R~$1\times10^{-3}$ m, we obtain $\tau_{th}$~0.5 s. Therefore, capacitors with $\tau_{RC}$ considerably smaller than 0.5 s should be used to ensure uniform heating.

Figure 2:
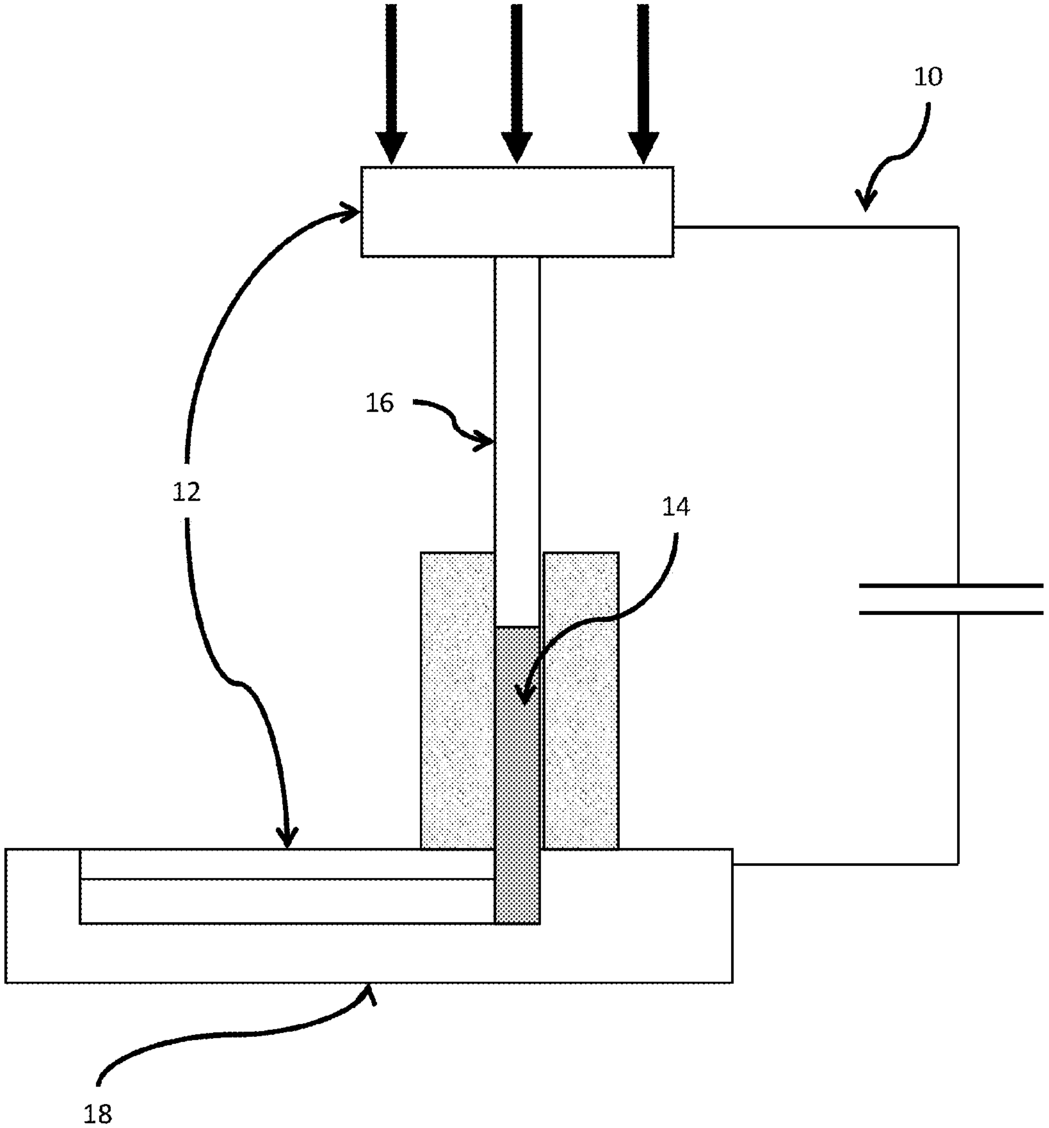
FIG. 2, provides a schematic of an exemplary embodiment of a rapid capacitor discharge forming method in accordance with the current invention.

Turning to the shaping method itself, a schematic of an exemplary shaping tool in accordance with the RCDF method of the current invention is provided in FIG. 2. As shown, the basic RCDF shaping tool includes a source of electrical energy (10) and two electrodes (12). The electrodes are used to apply a uniform electrical energy to a sample block (14) of uniform cross-section made of an amorphous material having an $S_{crit}$ value sufficiently low and a has a large $\rho_0$ value sufficiently high, to ensure uniform heating. The uniform electrical energy is used to uniformly heat the sample to a predetermined "process temperature" above the glass transition temperature of the alloy in a time scale of several milliseconds or less. The viscous liquid thus formed is simultaneously shaped in accordance with a preferred shaping method, including, for example, injection molding, dynamic forging, stamp forging blow molding, etc. to form an article on a time scale of less than one second.

It should be understood that any source of electrical energy suitable for supplying sufficient energy of uniform density to rapidly and uniformly heat the sample block to the predetermined process temperature, such as, for example, a capacitor having a discharge time constant of from 10 μs to 10 milliseconds may be used. In addition, any electrodes suitable for providing uniform contact across the sample block may be used to transmit the electrical energy. As discussed, in one preferred embodiment the electrodes are formed of a soft metal, such as, for example, Ni, Ag, Cu, or alloys made using at least 95 at % of Ni, Ag and Cu, and are held against the sample block under a pressure sufficient to plastically deform the contact surface of the electrode at the electrode/sample interface to conform it to the microscopic features of the contact surface of the sample block.

Although the above discussion has focused on the RCDF method generally, the current invention is also directed to an apparatus for shaping a sample block of amorphous material. In one preferred embodiment, shown schematically in FIG. 2, an injection molding apparatus may be incorporated with the RCDF method. In such an embodiment, the viscous liquid of the heated amorphous material is injected into a mold cavity (18) held at ambient temperature using a mechanically loaded plunger to form a net shape component of the metallic glass. In the example of the method illustrated in FIG. 2, the charge is located in an electrically insulating "barrel" or "shot sleeve" and is preloaded to an injection pressure (typically 1-100 MPa) by a cylindrical plunger made of a conducting material (such as copper or silver) having both high electrical conductivity and thermal conductivity. The plunger acts as one electrode of the system. The sample charge rests on an electrically grounded base electrode. The stored energy of a capacitor is discharged uniformly into the cylindrical metallic glass sample charge provided that certain criteria discussed above are met. The loaded plunger then drives the heated viscous melt into the net shape mold cavity.

Figure 3:
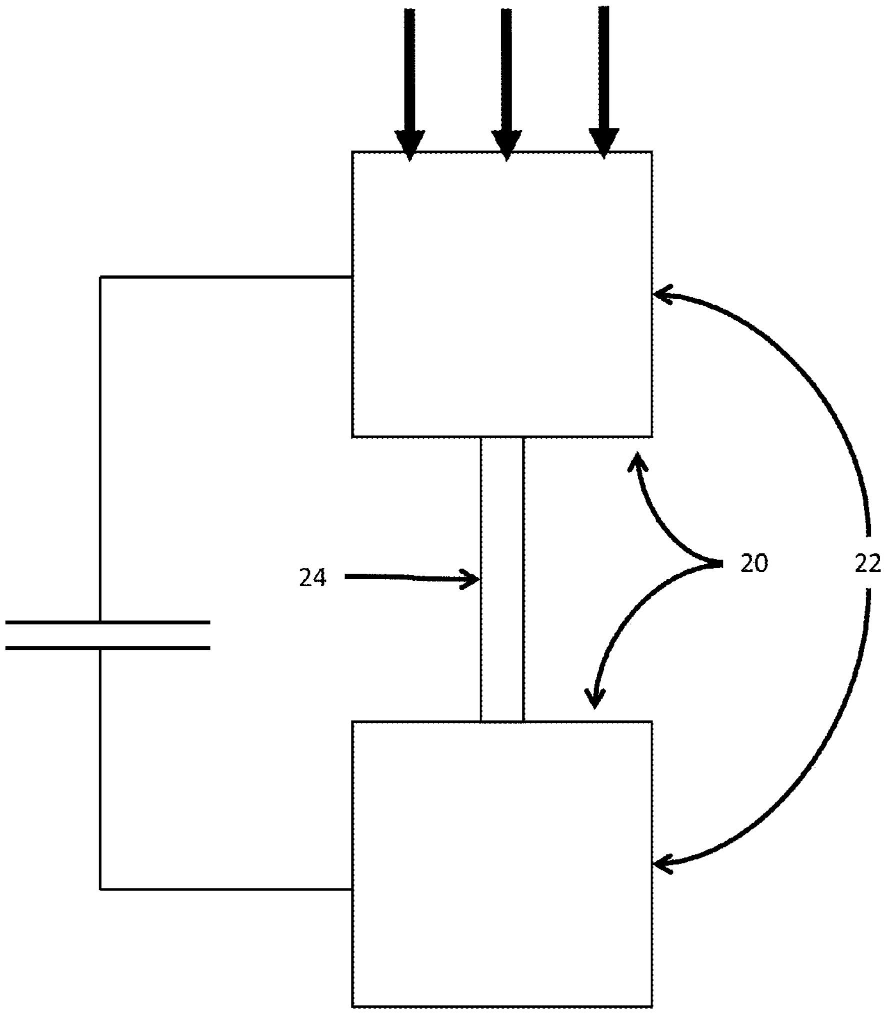
FIG. 3, provides a schematic of another exemplary embodiment of a rapid capacitor discharge forming method in accordance with the current invention.

Although an injection molding technique is discussed above, any suitable shaping technique may be used. Some alternative exemplary embodiments of other shaping methods that may be used in accordance with the RCDF technique are provided in FIGS. 3 to 5, and discussed below. As shown in FIG. 3, for example, in one embodiment a dynamic forge shaping method may be used. In such an embodiment, the sample contacting portions (20) of the electrodes (22) would themselves form the die tool. In this embodiment, the cold sample block (24) would be held under a compressive stress between the electrodes and when the electrical energy is discharged the sample block would become sufficiently viscous to allow the electrodes to press together under the predetermined stress thereby conforming the amorphous material of the sample block to the shape of the die (20).

Figure 4:
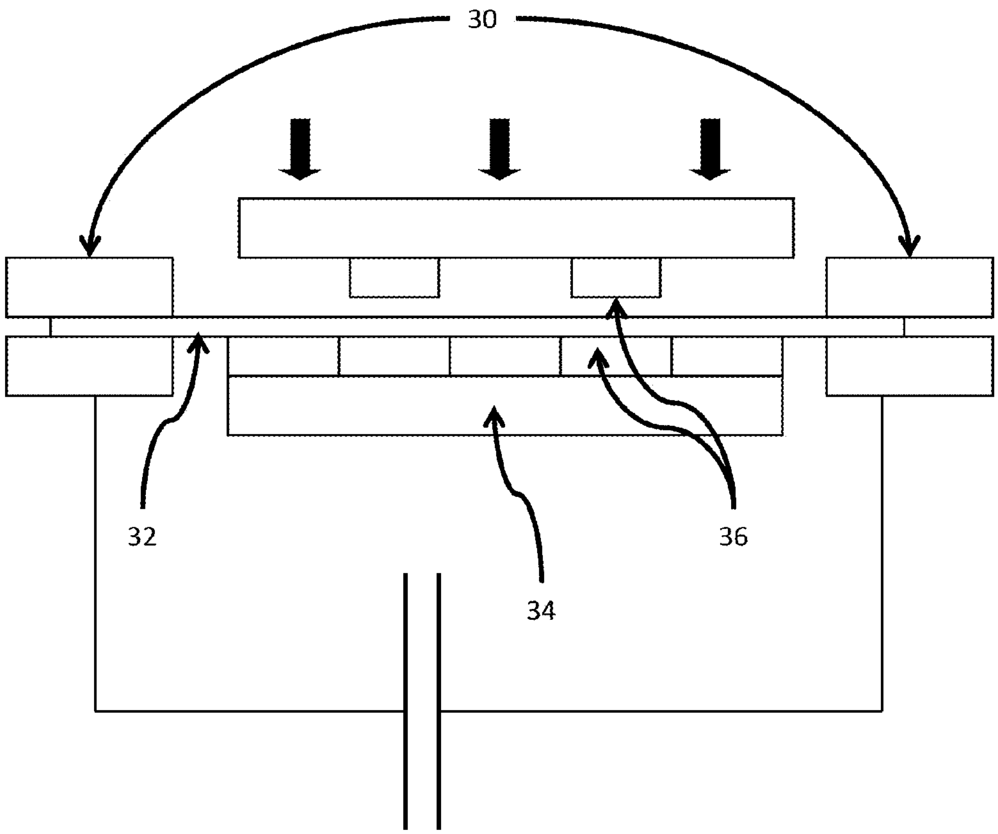
FIG. 4, provides a schematic of yet another exemplary embodiment of a rapid capacitor discharge forming method in accordance with the current invention.

In another embodiment, shown schematically in FIG. 4, a stamp form shaping method is proposed. In this embodiment, the electrodes (30) would clamp or otherwise hold the sample block (32) between them at either end. In the schematic shown a thin sheet of amorphous material is used, although it should be understood that this technique may be modified to operate with any suitable sample shape. Upon discharge of the electrical energy through the sample block, the forming tool or stamp (34), which as shown comprises opposing mold or stamp faces (36), would be brought together with a predetermined compressive force against portion of the sample held therebetween, thereby stamping the sample block into the final desired shape.

Figure 5:
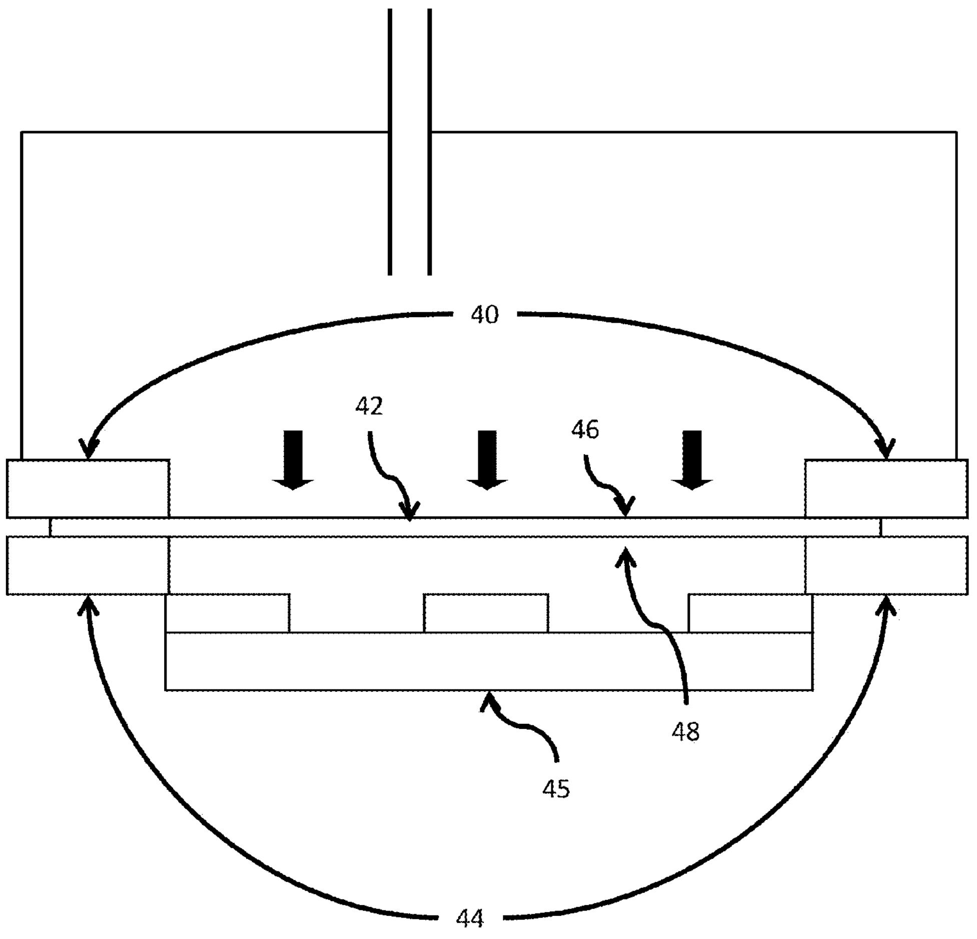
FIG. 5, provides a schematic of still another exemplary embodiment of a rapid capacitor discharge forming method in accordance with the current invention.

In yet another exemplary embodiment, shown schematically in FIG. 5, a blow mold shaping technique could be used. Again, in this embodiment, the electrodes (40) would clamp or otherwise hold the sample block (42) between them at either end. In a preferred embodiment, the sample block would comprise a thin sheet of material, although any shape suitable may be used. Regardless of its initial shape, in the exemplary technique the sample block would be positioned in a frame (44) over a mold (45) to form a substantially air-tight seal, such that the opposing sides (46 and 48) of the block (i.e., the side facing the mold and the side facing away from the mold) can be exposed to a differential pressure, i.e., either a positive pressure of gas or a negative vacuum. Upon discharge of the electrical energy through the sample block, the sample becomes viscous and deforms under the stress of the differential pressure to conform to the contours of the mold, thereby forming the sample block into the final desired shape.

Figure 6:
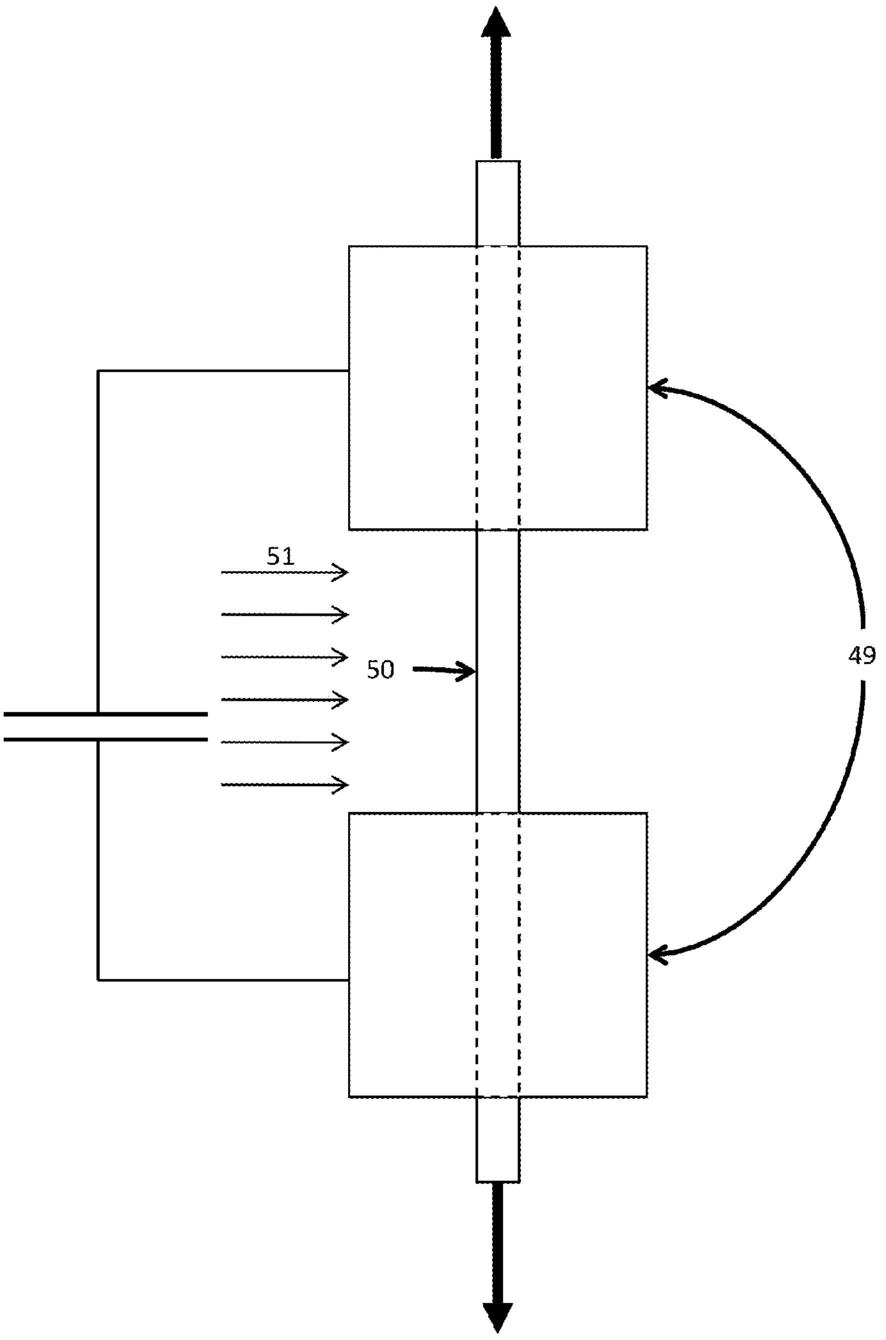
FIG. 6, provides a schematic of still another exemplary embodiment of a rapid capacitor discharge forming method in accordance with the current invention.

In yet another exemplary embodiment, shown schematically in FIG. 6, a fiber-drawing technique could be used. Again, in this embodiment, the electrodes (49) would be in good contact with the sample block (50) near either end of the sample, while a tensile force will be applied at either end of the sample. A stream of cold helium (51) is blown onto the drawn wire or fiber to facilitate cooling below glass transition. In a preferred embodiment, the sample block would comprise a cylindrical rod, although any shape suitable may be used. Upon discharge of the electrical energy through the sample block, the sample becomes viscous and stretches uniformly under the stress of the tensile force, thereby drawing the sample block into a wire or fiber of uniform cross section.

Figure 7:
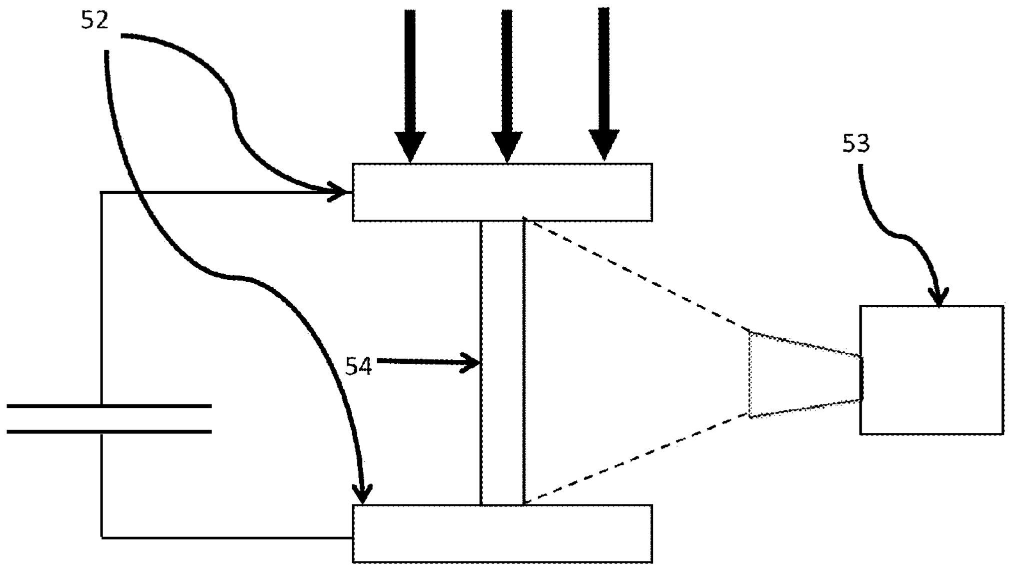
FIG. 7, provides a schematic of an exemplary embodiment of a rapid capacitor discharge forming method combined with a thermal imaging camera in accordance with the current invention.
Figure 8:
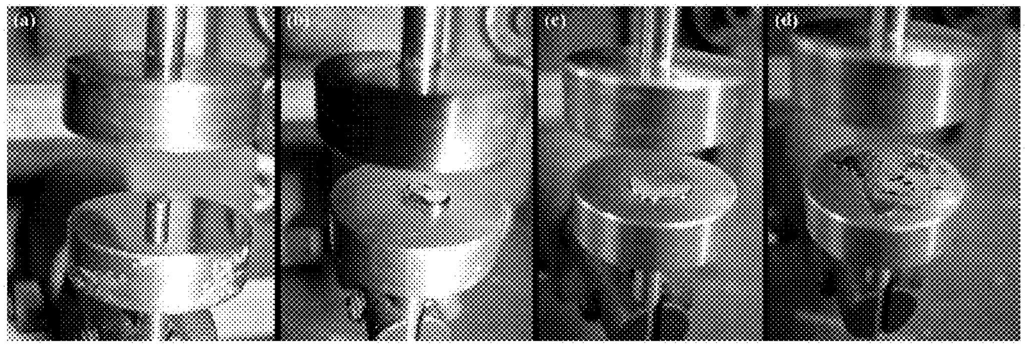
FIGS. 8*a* to 8*d*, provide a series of photographic images of experimental results obtained using an exemplary rapid capacitor discharge forming method in accordance with the current invention.

In still yet another embodiment, shown schematically in FIG. 7, the invention is directed to a rapid capacitor discharge apparatus for measuring thermodynamic and transport properties of the supercooled liquid. In one such embodiment, the sample (52) would be held under a compressive stress between two paddle shaped electrodes (53), while a thermal imaging camera (54) is focused on the sample. When the electrical energy is discharged, the camera will be activated and the sample block would be simultaneously charged. After the sample becomes sufficiently viscous, the electrodes will press together under the predetermined pressure to deform the sample. Provided that the camera has the required resolution and speed, the simultaneous heating and deformation process may be captured by a series of thermal images. Using this data the temporal, thermal, and deformational data can be converted into time, temperature, and strain data, while the input electrical power and imposed pressure can be converted into internal energy and applied stress, thereby yielding information of the temperature, and temperature-dependent viscosity, heat capacity and enthalpy of the sample.

Although the above discussion has focused on the essential features of a number of exemplary shaping techniques, it should be understood that other shaping techniques may be used with the RCDF method of the current invention, such as extrusion or die casting. Moreover, additional elements may be added to these techniques to improve the quality of the final article. For example, to improve the surface finish of the articles formed in accordance with any of the above shaping methods the mold or stamp may be heated to around or just below the glass transition temperature of the amorphous material, thereby smoothing surface defects. In addition, to achieve articles with better surface finish or net-shape parts, the compressive force, and in the case of an injection molding technique the compressive speed, of any of the above shaping techniques may be controlled to avoid melt front instability arising from high "Weber number" flows, i.e., to prevent atomization, spraying, flow lines, etc.

The RCDF shaping techniques and alternative embodiments discussed above may be applied to the production of small, complex, net shape, high performance metal components such as casings for electronics, brackets, housings, fasteners, hinges, hardware, watch components, medical components, camera and optical parts, jewelry etc. The RCDF method can also be used to produce small sheets, tubing, panels, etc. which could be dynamically extruded through various types of extrusion dyes used in concert with the RCDF heating and injection system.

In summary, the RCDF technique of the current invention provides a method of shaping amorphous alloys that allows for the rapid uniform heating of a wide range of amorphous materials and that is relatively cheap and energy efficient. The advantages of the RCDF system are described in greater detail below.

Rapid and Uniform Heating Enhances Thermplastic Processability:

Thermoplastic molding and forming of BMGs is severely restricted by the tendency of BMGs to crystallize when heated above their glass transition temperature, $T_g$. The rate of crystal formation and growth in the undercooted liquid above $T_g$ increases rapidly with temperature while the viscosity of the liquid falls. At conventional heating rates of ~20 C/min, crystallization occurs when BMGs are heated to a temperature exceeding $T_g$ by ΔT=30-150° C. This ΔT determines the maximum temperature and lowest viscosity for which the liquid can be thermoplastically processed. In practice, the viscosity is constrained to be larger than ~$10^4$ Pa-s, more typically $10^5$-$10^7$ Pa-s, which severely limits net shape forming. Using RCDF, the amorphous material sample can be uniformly heated and simultaneously formed (with total required processing times of milliseconds) at heating rates ranging from $10^4$-$10^7$ C/s. In turn, the sample can be thermoplastically formed to net shape with much larger ΔT and as a result with much lower process viscosities in the range of 1 to $10^4$ Pa-s, which is the range of viscosities used in the processing of plastics. This requires much lower applied loads, shorter cycle times, and will result in much better tool life.

RCDF Enables Processing of a Much Broader Range of BMG Materials:

The dramatic expansion of ΔT and the dramatic reduction of processing time to milliseconds enable a far larger variety of glass forming alloys to be processed. Specifically, alloys with small ΔT, or alloys having much faster crystallization kinetics and in turn far poorer glass forming ability, can be processed using RCDF. For example, cheaper and otherwise more desirable alloys based on Zr, Pd, Pt, Au, Fe, Co, Ti, Al, Mg, Ni and Cu and other inexpensive metals are rather poor glass formers with small ΔT and strong tendency to crystallize. These "marginal glass forming" alloys cannot be thermoplastically processed using any of the currently practiced methods, but could easily be used with the RCDF method of the current invention.

RCDF is Extremely Material Efficient:

Conventional processes that are currently being used to form bulk amorphous articles such as die casting require the use of feedstock material volume that far exceeds the volume of the part being cast. This is because of the entire ejected content of a die in addition to castings includes gates, runners, sprue (or biscuit), and flash, all of which are necessary for the molten metal passage towards the die cavity. In contrast, the RCDF ejected content in most cases will only include the part, and in the case of the injection molding apparatus, a shorter runner and a much thinner biscuit as compared to die casting. The RCDF method will therefore be particularly attractive for applications involving processing of high-cost amorphous materials, such as the processing of amorphous metal jewelry.

RCDF is Extremely Energy Efficient:

Competing manufacturing technologies such as die-casting, permanent-mold casting, investment casting and metal powder injection molding (PIM), are inherently far less energy efficient. In RCDF, the energy consumed is only slightly greater than that required to heat the sample to the desired process temperature. Hot crucibles, RF induction melting systems, etc. are not required. Further, there is no need to pour molten alloy from one container to another thereby reducing the processing steps required and the potential for material contamination and material loss.

RCDF Provides a Relatively Small, Compact, and Readily Automated Technology:

Compared with other manufacturing technologies, RCDF manufacturing equipment would be small, compact, clean, and would lend itself readily to automation with a minimum of moving parts and an essentially all "electronic" process.

Environmental Atmosphere Control Not Required:

The millisecond time scales required to process a sample by RCDF will result in minimal exposure of the heated sample to ambient air. As such, the process could be carried out in the ambient environment as opposed to current process methods where extended air exposure gives severe oxidation of the molten metal and final part.

EXEMPLARY EMBODIMENTS

The person skilled in the art will recognize that additional embodiments according to the invention are contemplated as being within the scope of the foregoing generic disclosure, and no disclaimer is in any way intended by the foregoing, non-limiting examples.

Example 1

Study of Ohmic Heating

To demonstrate the basic principle that for BMGs capacitive discharge with Ohmic heat dissipation in a cylindrical sample will give uniform and rapid sample heating a simple laboratory spot welding machine was used as a demonstration shaping tool. The machine, a Unitek 1048 B spot welder, will store up to 100 Joules of energy in a capacitor of ~10 μF. The stored energy can be accurately controlled. The RC time constant is of order 100 μs. To confine a sample cylinder, two paddle shaped electrodes were provided with flat parallel surfaces. The spot welding machine has a spring loaded upper electrode which permits application of an axial load of up to ~80 Newtons of force to the upper electrode. This, in turn permits a constant compressive stress ranging to ~20 MPa to be applied to the sample cylinder.

Small right circular cylinders of several BMG materials were fabricated with diameters of 1-2 mm and heights of 2-3 mm. The sample mass ranged from ~40 mg to about ~170 mg and was selected to obtain $T_F$ well above the glass transition temperature of the particular BMG. The BMG materials were a Zr—Ti-based BMG (Vitreloy 1, a Zr—Ti—Ni—Cu—Be BMG), a Pd-based BMG (Pd—Ni—Cu—P alloy), and an Fe-based BMG (Fe—Cr—Mo—P—C) having glass transitions ($T_g$) at 340 C, 300 C, and ~430 C respectively. All of these metallic glasses have $S \sim -1\times10^{-4} << S_{crit}$.

Figure 9:
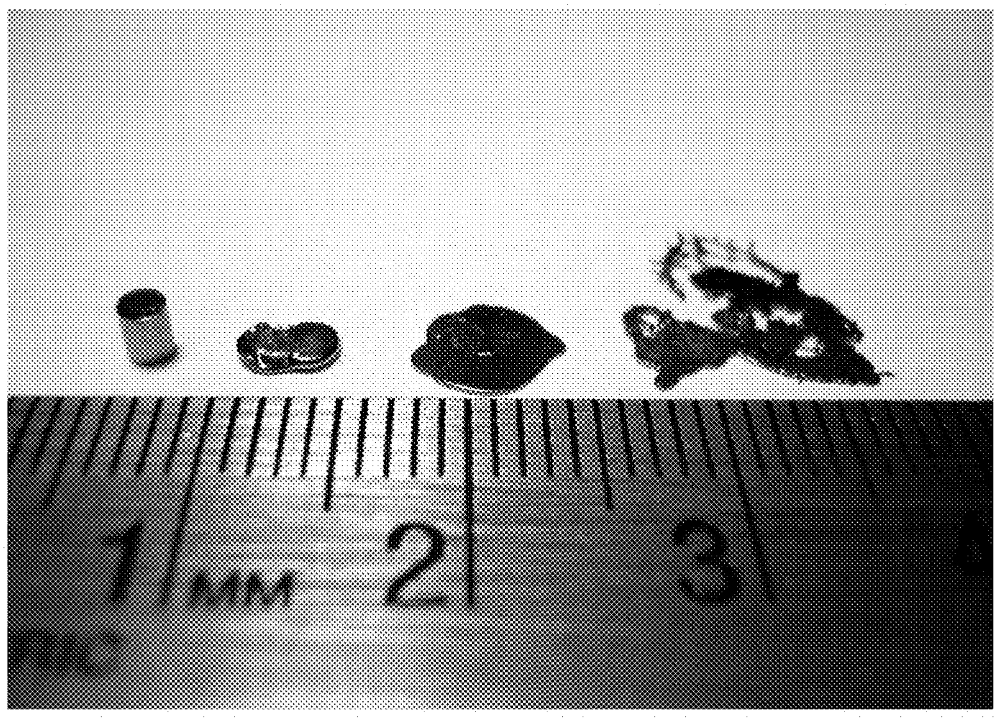
FIG. 9, provides a photographic image of experimental results obtained using an exemplary rapid capacitor discharge forming method in accordance with the current invention.

FIGS. 8a to 8d show the results of a series of tests on Pd-alloy cylinders of radius 2 mm and height 2 mm (8a). The resistivity of the alloy is $\rho_0$=190 μΩ-cm, while $S \sim -1\times10^{-4}$ ($C^{-1}$). Energies of E=50 (8b), 75 (8c), and 100 (8d) Joules were stored in the capacitor bank and discharged into the sample held under a under a compressive stress of ~20 MPa. The degree of plastic flow in the BMG was quantified by measuring the initial and final heights of the processed samples. It is particularly important to note that the samples are not observed to bond to the copper electrode during processing. This can be attributed to the high electrical and thermal conductivity of copper compared to the BMG. In short, the copper never reaches sufficiently high temperature to allow wetting by the "molten" BMG during the time scale of processing (~milliseconds). Further, it should be noted that there is little or no damage to the electrode surface. The final processed samples were freely removed from the copper electrode following processing and are shown in FIG. 9 with a length scale reference.

Figure 10:
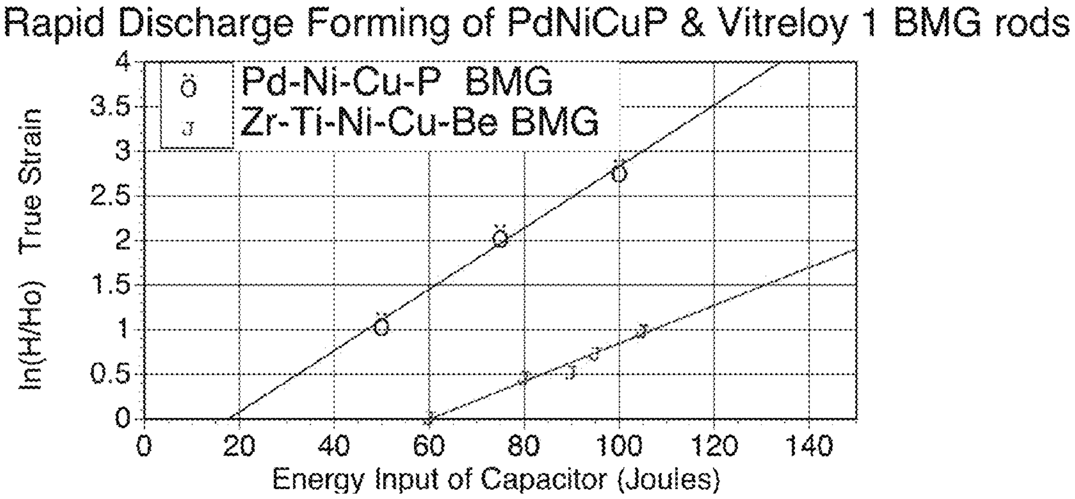
FIG. 10, provides a data plot summarizing experimental results obtained using an exemplary rapid capacitor discharge forming method in accordance with the current invention.

The initial and final cylinder heights were used to determine the total compressive strain developed in the sample as it deformed under load. The engineering "strain" is given by $H_0/H$ where $H_0$ and H are the initial (final) height of the sample cylinder respectively. The true strain is given by $\ln(H_0/H)$. The results are plotted vs. discharge energy in FIG. 10. These results indicated that the true strain appears to be a roughly linear increasing function of the energy discharged by the capacitor.

These tests results indicate that the plastic deformation of the BMG sample blank is a well-defined function of the energy discharged by the capacitor. Following dozens of tests of this type, it is possible to determine that plastic flow of the sample (for a given sample geometry) is a very well defined function of energy input, as is clearly shown in FIG. 10. In short, using the RCDF technique plastic processing can be accurately controlled by input energy. Moreover, the character of the flow qualitatively and quantitatively changes with increasing energy. Under the applied compressive load of ~80 Newtons, a clear evolution in the flow behavior with increasing E can be observed. Specifically, for the Pd-alloy the flow for E=50 Joules is limited to a strain of $\ln(H_0/H_F)\sim1$. The flow is relatively stable but there is also evidence of some shear thinning (e.g. non-Newtonian flow behavior). For E=75 Joules, more extensive flow is obtained with $\ln(H_0/H_F)\sim2$. In this regime the flow is Newtonian and homogeneous, with a smooth & stable melt front moving through the "mold". For E=100 Joules, very large deformation is obtained with a final sample thickness of 0.12 cm and true strain of ~3. There is clear evidence of flow break-up, flow lines, and liquid "splashing" characteristic of high "Weber Number" flow. In short, a clear transition can be observed from a stable to unstable melt front moving in the "mold". Accordingly, using RCDF the qualitative nature and extent of plastic flow can be systematically and controllably varied by simple adjustment of the applied load and the energy discharged to the sample.

Example 2

Injection Molding Apparatus

In another example, a working prototype RCDF injection molding apparatus was constructed. Schematics of the device are provided in FIGS. 11*a* to 11*e*. Experiments conducted with the shaping apparatus prove that it can be used to injection mold charges of several grams into net-shape articles in less than one second. The system as shown is capable of storing an electrical energy of ~6 KJoules and applying a controlled process pressure of up to ~100 MPa to be used to produce small net shape BMG parts.

The entire machine is comprised of several independent systems, including an electrical energy charge generation system, a controlled process pressure system, and a mold assembly. The electrical energy charge generation system comprises a capacitor bank, voltage control panel and voltage controller all interconnected to a mold assembly (60) via a set of electrical leads (62) and electrodes (64) such that an electrical discharge of may be applied to the sample blank through the electrodes. The controlled process pressure system (66) includes an air supply, piston regulator, and pneumatic piston all interconnected via a control circuit such that a controlled process pressure of up to ~100 MPa may be applied to a sample during shaping. Finally, the shaping apparatus also includes the mold assembly (60), which will be described in further detail below, but which is shown in this figure with the electrode plunger (68) in a fully retracted position.

Figure 11A:
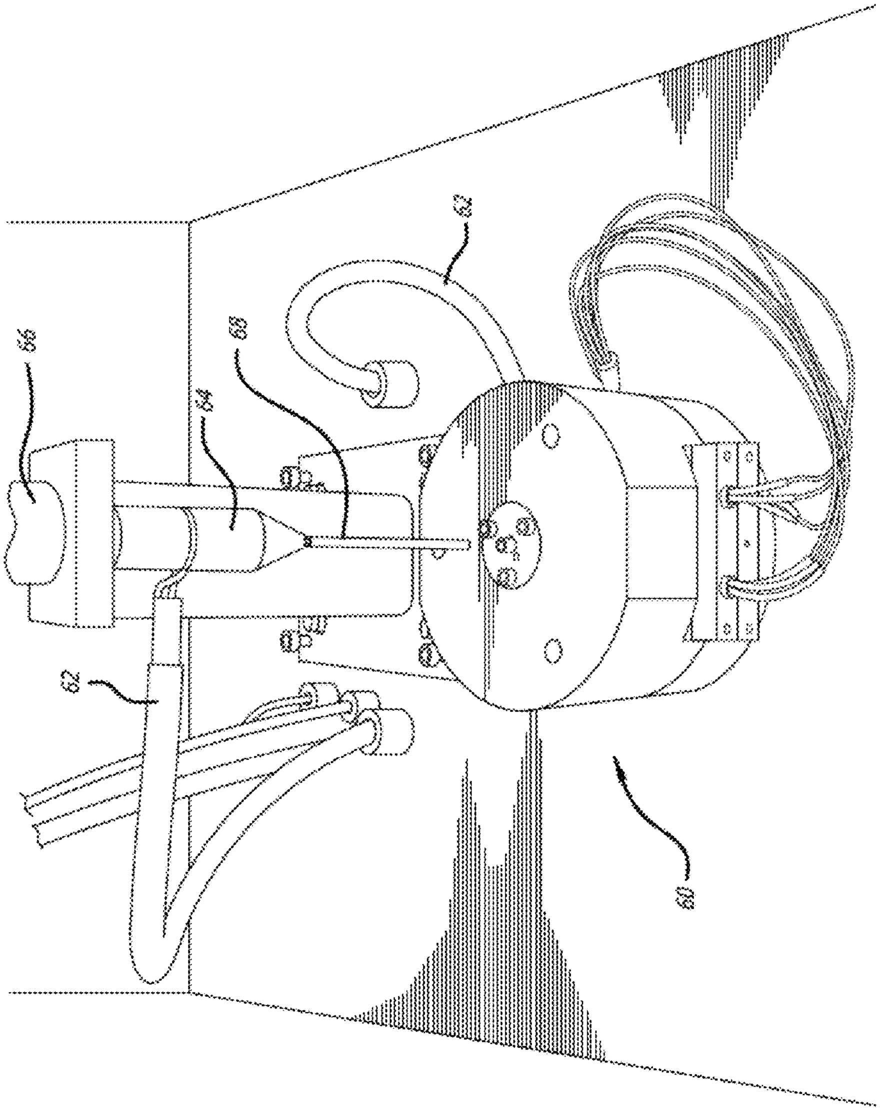
FIGS. 11*a* to 11*e* provide a set of schematics of an exemplary rapid capacitor discharge apparatus in accordance with the current invention.
Figure 11B:
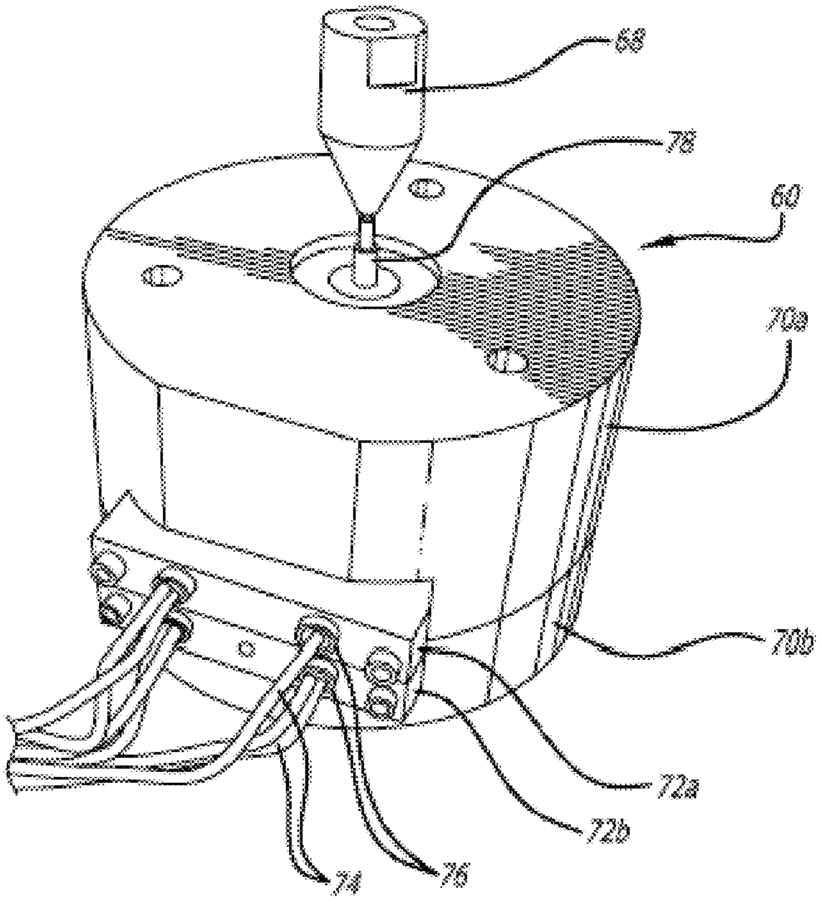

The total mold assembly is shown removed from the larger apparatus in FIG. 11*b*. As shown the total mold assembly includes top and bottom mold blocks (70*a* and 70*b*), the top and bottom parts of the split mold (72*a* and 72*b*), electrical leads (74) for carrying the current to the mold cartridge heaters (76), an insulating spacer (78), and the electrode plunger assembly (68) in this figure shown in the "fully depressed" position.

Figure 11C:
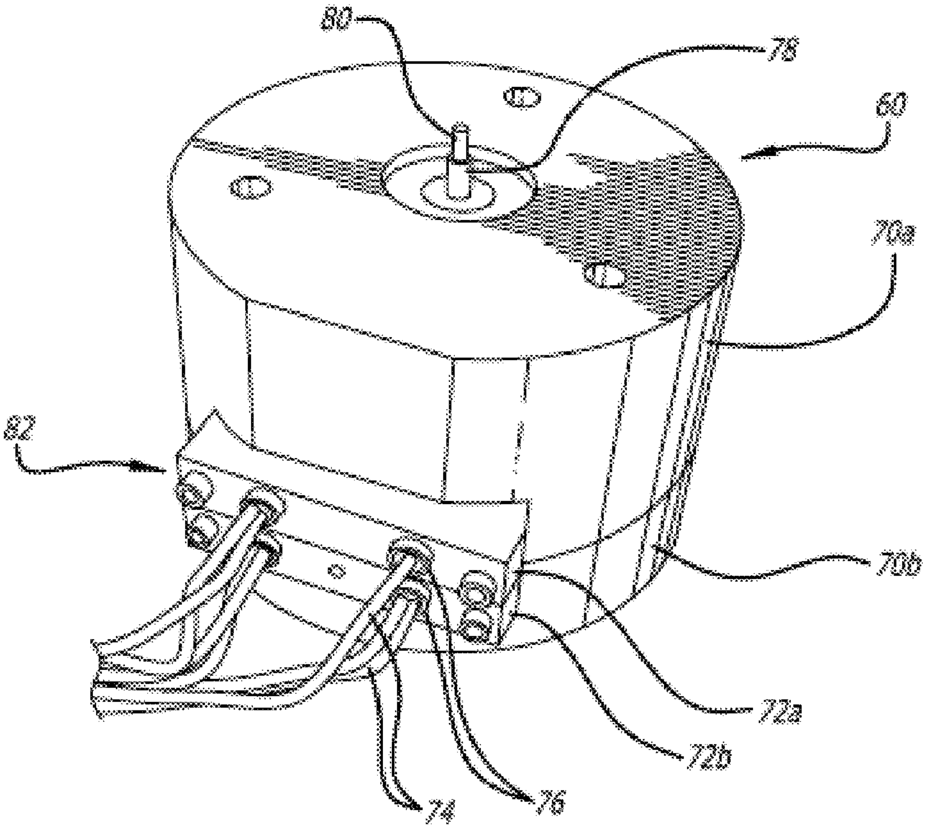
Figure 11D:
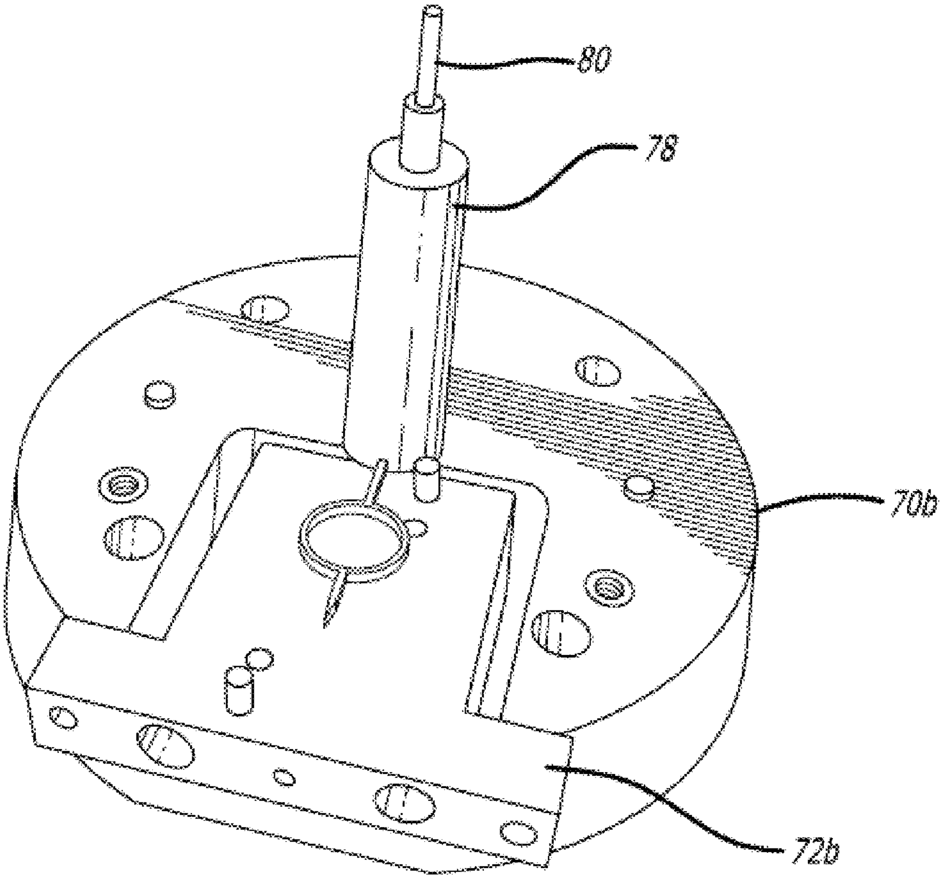
Figure 11E:
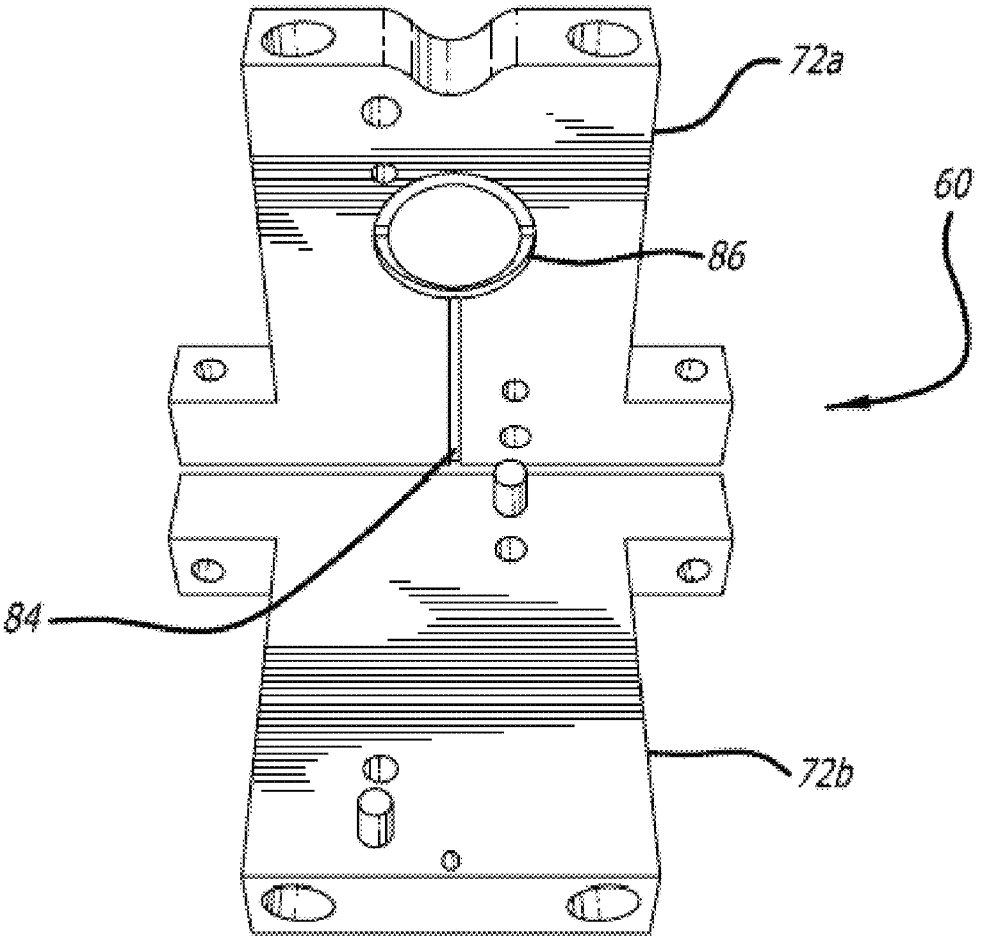

As shown in FIGS. 11*c* and 11*d*, during operation a sample block of amorphous material (80) is positioned inside the insulating sleeve (78) atop the gate to the split mold (82). This assembly is itself positioned within the top block (72*a*) of the mold assembly (60). The electrode plunger (not shown) would then be positioned in contact with the sample block (80) and a controlled pressure applied via the pneumatic piston assembly.

Figure 12A:
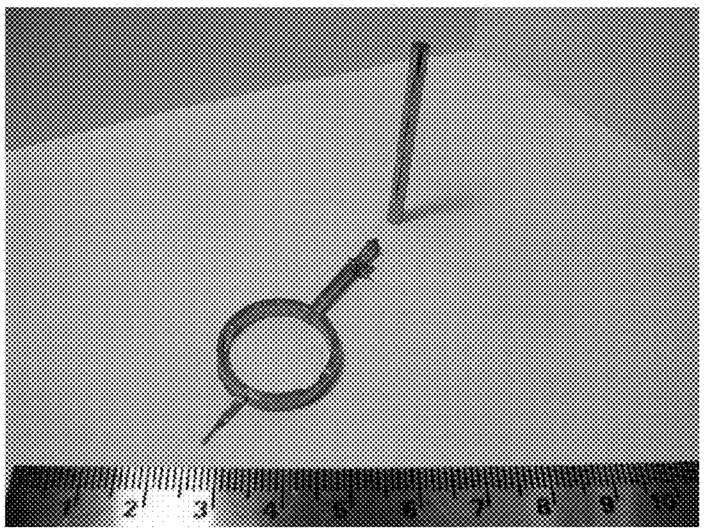
FIGS. 12*a* and 12*b* provide photographic images of a molded article made using the apparatus shown in FIGS. 11*a* to 11*e*.
Figure 12B:

Once the sample block is in position and in positive contact with the electrode the sample block is heated via the RCDF method. The heated sample becomes viscous and under the pressure of the plunger is controllably urged through the gate (84) into the mold (72). As shown in FIG. 10*e*, in this exemplary embodiment, the split mold (60) takes the form of a ring (86). Sample rings made of a $Pd_{43}Ni_{10}Cu_{27}P_{20}$ amorphous material formed using the exemplary RCDF apparatus of the current invention are shown in FIGS. 12*a* and 12*b*.

This experiment provides evidence that complex net-shape parts may be formed using the RCDF technique of the current invention. Although the mold is formed into the shape of a ring in this embodiment, one of skill in the art will recognize that the technique is equally applicable to a wide variety of articles, including small, complex, net shape, high performance metal components such as casings for electronics, brackets, housings, fasteners, hinges, hardware, watch components, medical components, camera and optical parts, jewelry etc.

DOCTRINE OF EQUIVALENTS

Those skilled in the art will appreciate that the foregoing examples and descriptions of various preferred embodiments of the present invention are merely illustrative of the invention as a whole, and that variations in the steps and various components of the present invention may be made within the spirit and scope of the invention. For example, it will be clear to one skilled in the art that additional processing steps or alternative configurations would not affect the improved properties of the rapid capacitor discharge forming method/apparatus of the current invention nor render the method/apparatus unsuitable for its intended purpose. Accordingly, the present invention is not limited to the specific embodiments described herein but, rather, is defined by the scope of the appended claims.

What is claimed is:

1. A method of rapidly heating and shaping a metallic glass using a rapid capacitor discharge comprising:

providing a sample of metallic glass formed from a metallic glass forming alloy, said sample having a substantially uniform cross-section;

discharging a quantum of electrical energy of at least 50 Joules uniformly through said sample to uniformly heat said sample at a rate of at least 500 K/sec to a processing temperature between the glass transition temperature of the metallic glass and the equilibrium melting point of the metallic glass forming alloy and applying a deformational force to shape the heated sample into an article; and cooling said article to a temperature below the glass transition temperature of the metallic glass.

2. The method of claim 1, wherein the metallic glass has a resistivity that does not increase with temperature.

3. The method of claim 1, wherein the metallic glass has a relative change of resistivity per unit of temperature change (S) of no greater than $1\times10^{-4}$° C.$^{-1}$ and a resistivity at room temperature ($\rho_0$) between 80 and 300 μΩ-cm.

4. The method of claim 1, wherein the quantum of electrical energy is at least about 100 Joules and a discharge time constant of between 10 μs and 10 ms.

5. The method of claim 1, wherein the processing temperature is about half-way between the glass transition temperature of the metallic glass and the equilibrium melting point of the metallic glass forming alloy.

6. The method of claim 1, wherein the processing temperature is such that the viscosity of the heated sample is from 1 to $10^4$ Pas-sec.

7. The method of claim 1, wherein the sample is substantially defect free.

8. The method of claim 1, wherein the metallic glass is an alloy based on an elemental metal selected from the group consisting of Zr, Pd, Pt, Au, Fe, Co, Ti, Al, Mg, Ni and Cu.

9. The method of claim 1, wherein the step of discharging said quantum of electrical energy occurs through at least two electrodes connected to opposite ends of said sample and generates a dynamic electrical field in said sample, and wherein the electromagnetic skin depth of the dynamic electric field generated is large compared to the radius, width, thickness, and length of the charge.

10. The method of claim 9, wherein the sample is preloaded between the electrodes prior to discharging the energy to generate a pressure at the electrode/sample interface equal to greater than the yield strength of the electrode.

11. The method of claim 1 wherein shaping is selected from the group consisting of injection molding, dynamic forging, stamp forging and blow molding.

12. The method of claim 11, wherein shaping is performed with a shaping tool is heated to a temperature around the glass transition temperature of the metallic glass.

13. The method of claim 1, wherein the heating and shaping of the sample are complete in a time of between 100 μs to 1 s.

14. The method of claim 1, further comprising generating a pre-pulse at the sample prior to discharging the energy, the energy of said pre-pulse being sufficient to raise the temperature of the sample at the interface to above the glass transition of the metallic glass.

15. The method in claim 1, wherein the deformational force is a tensile deformational force applied to the sample during the discharge of energy to form a wire or fiber of substantially uniform cross section.

16. The method in claim 15, further comprising directing a stream of cold helium onto the wire or fiber.

* * * * *